United States Patent
Sato et al.

(10) Patent No.: US 7,164,253 B2
(45) Date of Patent: Jan. 16, 2007

(54) MOTOR DRIVE CONTROL APPARATUS (75) Inventors: Eiji Sato, Toyota (JP); Sumikazu Shamoto, Nagoya (JP); Masayuki Komatsu, Aichi-gun (JP); Ryoji Oki, Toyota (JP); Makoto Nakamura, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 99 days.

(21) Appl. No.: 10/484,385

(22) PCT Filed: Jul. 31, 2002

(86) PCT No.: PCT/JP02/07800

§ 371 (c)(1),
(2), (4) Date: Jan. 21, 2004

(87) PCT Pub. No.: WO03/015254

PCT Pub. Date: Feb. 20, 2003

(65) Prior Publication Data

US 2004/0165868 A1 Aug. 26, 2004

(30) Foreign Application Priority Data

Aug. 2, 2001 (JP) .............................. 2001-234824

(51) Int. Cl.
*H02P 27/04* (2006.01)
(52) U.S. Cl. ........................... 318/801; 318/34; 318/77; 318/105; 318/109; 318/112
(58) Field of Classification Search ................ 318/801, 318/34–41, 599, 811, 139
See application file for complete search history.

(56) References Cited

U.S. PATENT DOCUMENTS

| | | | | |
|---|---|---|---|---|
| 4,263,535 A | * | 4/1981 | Jones ............................ | 318/87 |
| 4,292,531 A | * | 9/1981 | Williamson ................... | 290/14 |
| 4,467,408 A | * | 8/1984 | Matulevich et al. .......... | 363/54 |
| 4,482,848 A | | 11/1984 | Heal et al. | |
| 4,999,561 A | * | 3/1991 | Kaga et al. ................... | 318/812 |
| 5,052,908 A | * | 10/1991 | Inaba et al. .................. | 425/150 |
| 5,065,302 A | * | 11/1991 | Kanazawa ..................... | 363/37 |
| 5,359,154 A | * | 10/1994 | Tsukasa et al. .............. | 177/145 |
| 5,373,195 A | | 12/1994 | De Doncker et al. | |
| 5,373,223 A | * | 12/1994 | Akagi et al. ................. | 318/722 |
| 5,396,214 A | * | 3/1995 | Kumar ......................... | 338/279 |
| 5,420,777 A | | 5/1995 | Muto | |

(Continued)

FOREIGN PATENT DOCUMENTS

EP 1 219 493 A1 7/2002

(Continued)

*Primary Examiner*—Lincoln Donovan
*Assistant Examiner*—Renata McCloud
(74) *Attorney, Agent, or Firm*—Oliff & Berridge, PLC (57) ABSTRACT

On end of a reactor (L1) is connected to a positive electrode of a battery (B1) and the other end is connected to a power line via a transistor (Q1) and to the ground via a transistor (Q2). By PWM control of the transistors (Q1, Q2), an arbitrary increased voltage is obtained in the power line. It is possible to obtain an optimal inverter input voltage (power line voltage) according to the motor drive state, thereby increasing efficiency. Thus, it is possible to optimize the inverter input voltage according to the motor drive condition.

17 Claims, 9 Drawing Sheets

U.S. PATENT DOCUMENTS

| | | | |
|---|---|---|---|
| 5,589,743 A * | 12/1996 | King | 318/139 |
| 5,796,175 A | 8/1998 | Itoh et al. | |
| 6,236,583 B1 | 5/2001 | Kikuchi et al. | |
| 6,326,702 B1 * | 12/2001 | Yonekura et al. | 290/40 C |
| 6,831,442 B1 * | 12/2004 | Hsu et al. | 318/803 |
| 6,930,460 B1 * | 8/2005 | Ishikawa et al. | 318/442 |

FOREIGN PATENT DOCUMENTS

| | | |
|---|---|---|
| JP | A 61-9192 | 1/1986 |
| JP | A 8-214592 | 8/1996 |
| JP | A 10-66383 | 3/1998 |
| JP | A 10-127050 | 5/1998 |
| JP | A 10-136570 | 5/1998 |
| JP | A 11-69882 | 3/1999 |
| JP | A 11-299290 | 10/1999 |
| JP | A 11-341897 | 12/1999 |
| JP | A 2000-324891 | 11/2000 |
| JP | A 2001-157487 | 6/2001 |
| JP | A 2001-275367 | 10/2001 |

* cited by examiner

MOTOR DRIVE CONTROL APPARATUS

TECHNICAL FIELD

The present invention relates to a motor drive controller for supplying output from a dc power source to a motor through an inverter, and controlling drive of the motor.

BACKGROUND ART

Conventionally, a hybrid vehicle or an electric vehicle has a motor for traveling, and traveling is accomplished by driving this motor. A battery is therefore required to supply electrical power to the motor, and a high voltage battery of a few hundred volts is normally used in order to efficiently supply electrical power to a high output motor. On the other hand, various components (accessories) operated by electrical power are mounted in the vehicle, and a 12V battery (low voltage battery) is used as a battery for these accessories. High voltage output of the high voltage battery is then stepped down to 12V using a converter to charge the low voltage battery.

Also, in a high rotational speed region of the motor, a counter electromotive force is large, which means that if the voltage applied to the motor is low, maximum torque for the high rotational speed range will become small.

In Japanese Patent Laid-open No. Hei 10-136570, a converter is arranged between a battery and an inverter and a boosted voltage is supplied to the inverter using the converter. It is therefore possible to apply a high voltage from the inverter to the motor, and it is possible to increase maximum torque in a high rotational speed range of the motor. This publication also proposes using a converter as a rectifier for when charging from the outside.

The above publication therefore shows boosting of a battery voltage using a converter and supply of that boosted voltage to a motor. However, this publication simply discloses boosting a supply to a motor and does not consider control of the operation in boosting by the controller.

DISCLOSURE OF THE INVENTION

The object of the present invention is to provide a motor drive controller that can optimize inverter input voltage in response to motor drive conditions.

The present invention is a motor drive controller for supplying output of a dc power source to a motor through an inverter and controlling drive of a motor, comprising a converter for voltage converting output voltage from the dc power source for supply to the inverter, and a control section for controlling supply current to the motor through PWM control of the inverter, the converter comprising a reactor connected at one end to the dc power source and at least two switching elements, being an upper switching element connecting the other end of the reactor to a power source side of the inverter and a lower switching element connecting to an earth side of the inverter, wherein the control section calculates an inverter input voltage target value appropriate to efficiently drive a motor in response to rotational speed of the motor and a target output torque, and performs PWM control of the converter switching elements in order to achieve this input voltage target value.

With the present invention, it is therefore possible to increase inverter input voltage above the battery voltage because of the inverter. Since motor output is a product of voltage applied to the motor and motor current, it is possible to reduce motor current for the same motor output by increasing the voltage applied to the motor. It is possible to reduce inverter current capacity by increasing the inverter input voltage, to therefore enable miniaturization and cost reduction of the inverter. Also, since output in a high rotational speed range of the motor is increased by increasing the voltage applied to the motor, this resultantly enables miniaturization and cost reduction of the motor.

In particular, with the present invention an optimum voltage to be applied to the motor at any given time is calculated based on the rotational speed of the motor and a target output torque (output torque command), and an inverter input voltage target value is determined based on this calculated optimum voltage. As a result, efficient drive of the motor is carried out by applying the optimum voltage based on running conditions of the motor at that time. In particular, since the optimum voltage is calculated and this voltage controlled, it is possible to prevent deterioration in efficiency due to the voltage rising beyond what is necessary.

Also, the converter preferably has a three phase structure provided with three sets of the reactor and the two switching elements. With this structure, it is possible to smooth the output voltage to suppress the occurrence of ripple.

It is also preferable, in the case where the inverter input voltage target value is lower than the dc source voltage, to turn the upper switching element of the inverter on and turn the lower switching element off. When the motor is rotating at low speed, an input target voltage of the inverter to drive efficiently becomes smaller than the voltage of the dc power source. At this time, turning the upper switching element of the inverter on and turning the lower switching element off does not produce any switching loss at the same time as setting to the converter minimum drive voltage, which enables efficient drive.

It is also preferable for the converter to have a full bridge configuration with both ends of a battery and one end of a reactor being connected through two switching elements. With this structure, it also becomes possible to step-down the dc power source output, and to always have the optimum inverter applied voltage.

It is also preferable to connect a separate inverter for supplying current to a separate motor to the output of the converter, and for the control section to output a higher voltage of two inverter input target voltages calculated from the rotational speeds and target outputs of the two motors. With a two motor system, inverter input voltage to obtain the most efficient drive for respective motors will often differ. When the inverter input voltage is high, only switching loss is increased, but when the input voltage is low, motor current also increases and loss of both the motor and inverter increases. This means that efficiency is better with a high voltage. It is thus possible to raise overall efficiency by selecting the higher of the respective inverter input target voltages.

When the calculated inverter input target voltage exceeds a specified upper limit value, the control section preferably sets the input target voltage to the upper limit value.

The present invention also provides a motor drive control method for a two motor system, comprising a converter, including a reactor, having one end connected to a dc power source, and at least two switching elements, being an upper switching element connecting the other end of the reactor to a power source side of an inverter, and a lower switching element connecting to an earth side of the inverter, two inverters for receiving output from the converter and converting to a specified alternating current, and two motors respectively driven by alternating current from the two inverters, wherein inverter input voltage target values suitable for efficient drive of the two motors are calculated in response to rotation speed and target output torque of the two motors, and a higher voltage of the two calculated inverter input voltage target values is selected as a target value and the switching elements of the inverter are subjected to PWM control.

The present invention also provides a motor drive control program for a two motor system, comprising a converter, including a reactor, having one end connected to a dc power source, and at least two switching elements, being an upper switching element connecting the other end of the reactor to a power source side of an inverter, and a lower switching element connecting to an earth side of the inverter, two inverters for receiving output from the converter and converting to a specified alternating current, two motors respectively driven by alternating current from the two inverters, and a control section for controlling switching of the switching elements of the converter, or a medium storing such a program, wherein, in the control section, inverter input voltage target values suitable for efficient drive of the two motors are calculated in response to rotation speed and target output torque of the two motors, a higher voltage of the two calculated inverter input voltage target values is adopted as a target value, and the switching elements of the inverter are subjected to PWM control so that converter output becomes the adopted target value.

BEST MODE FOR CARRYING OUT THE INVENTION

Embodiments of the present invention will now be described below based on the drawings.

Figure 1:
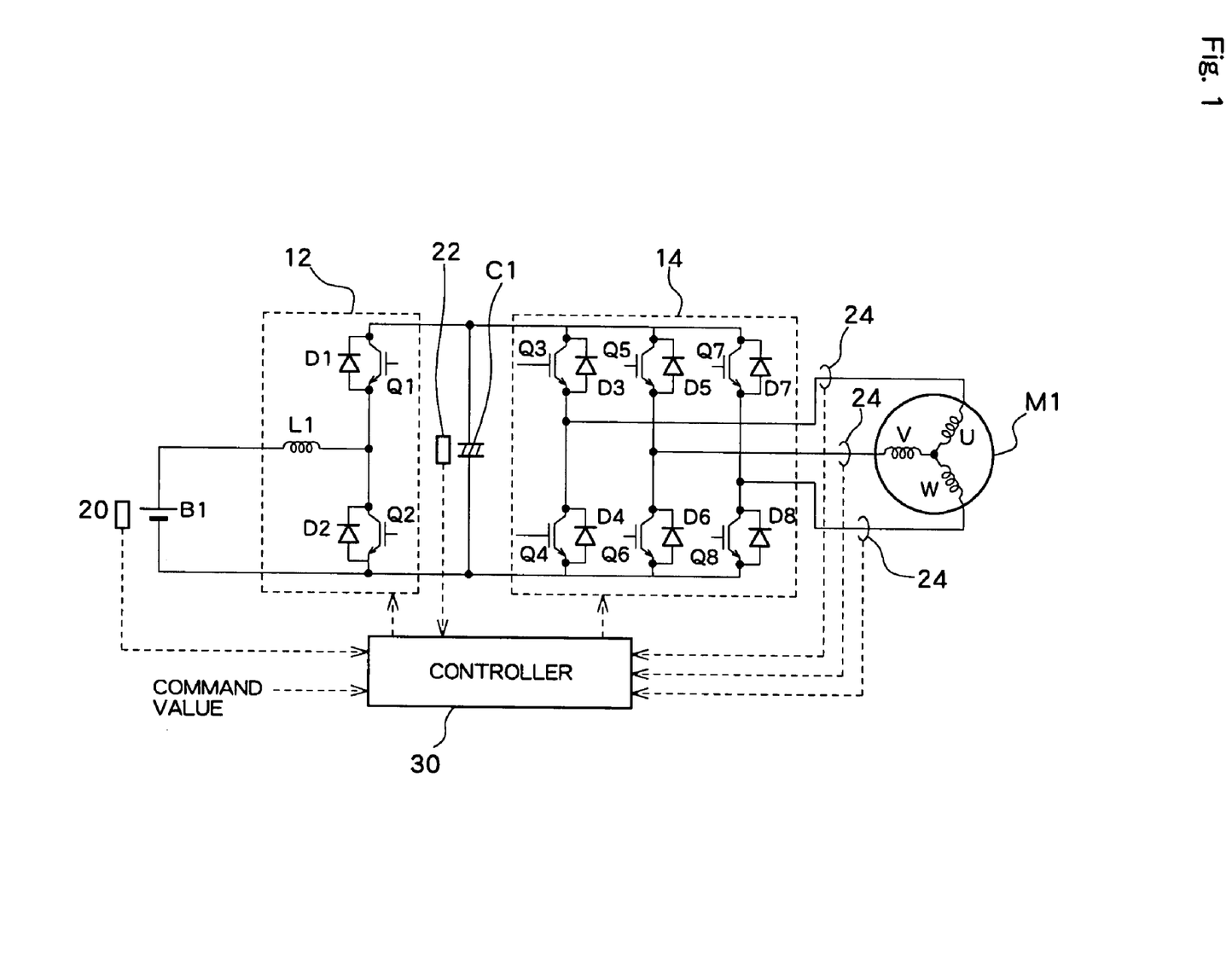
FIG. 1 is a drawing showing the structure of an embodiment of the present invention.

FIG. 1 is a drawing showing the structure of one embodiment, where a battery B1, being a dc power source, is a secondary battery such as a nickel metal hydride (NiMH) or lithium ion battery. One end of a reactor L1 is connected to the positive electrode of the battery B1. The other end of the reactor L1 is connected to an intermediate point of NPN transistors Q1 and Q1 that are connected in series (connection point of the emitter of transistor Q1 and the collector of transistor Q2). The collector of transistor A1 is connected to a power source line while the emitter of transistor Q2 is connected to earth. Diodes D1 and D2 are respectively arranged across the emitter and collector of each of the transistors Q1 and Q2 to allow current to flow from an emitter side to a collector side. A converter 12 is thus constituted by the reactor L1, transistors Q1 and Q1, and the diodes, D1 and D2.

A capacitor C1 is arranged between the power source line and earth, being the output of the converter 12, to stabilize the power source line voltage (inverter input voltage).

A U phase arm made up of NPN transistors Q3 and Q4 connected in series, a V phase arm made up of NPN transistors Q5 and Q6 connected in series, and a W phase arm made up of NPN transistors Q7 and Q8 connected in series are arranged between the power source line and earth. Diodes D3–D8 are also arranged across the emitters and collectors of each of transistors Q3–Q8, allowing current to flow from an emitter side to a collector side. An inverter 14 is constituted by these transistors Q3–Q8 and diodes D3–D8.

Intermediate points of each or the phase arms are connected to respective phase ends of respective phase coils of a motor M1. Specifically, the motor M1 is a three-phase permanent magnet motor, constructed by connecting one end of U, V and W phase coils in common to a middle point, with the other end of the U phase coil being connected to a mid-point of the transistors Q3 and Q4, the other end of the V phase coil being connected to a mid point of the transistors Q5 and Q6, and the other end of the W phase coil being connected to a mid point of the transistors Q7 and Q8.

The output voltage of the battery B1 is detected by a transistor 20, a voltage across the two ends of the capacitor C1, namely the inverter input voltage, is detected by a voltage sensor 22, a current value for each phase of the motor M1 is detected by current sensors 24, and these detection values are supplied to a controller 30. The controller 30 controls switching of the transistors Q3–Q8 of the inverter 14 based on these sensor detection values and a motor output command etc. to control drive of the motor M1, and also controls switching of the transistors Q1 and Q2 of the converter 12. The controller 30 is constituted by a microcomputer or the like, and controls operation of the inverter 14 and converter 12 by executing a specified program stored in a storage section (constituted by a flash ROM etc.).

Figure 2:
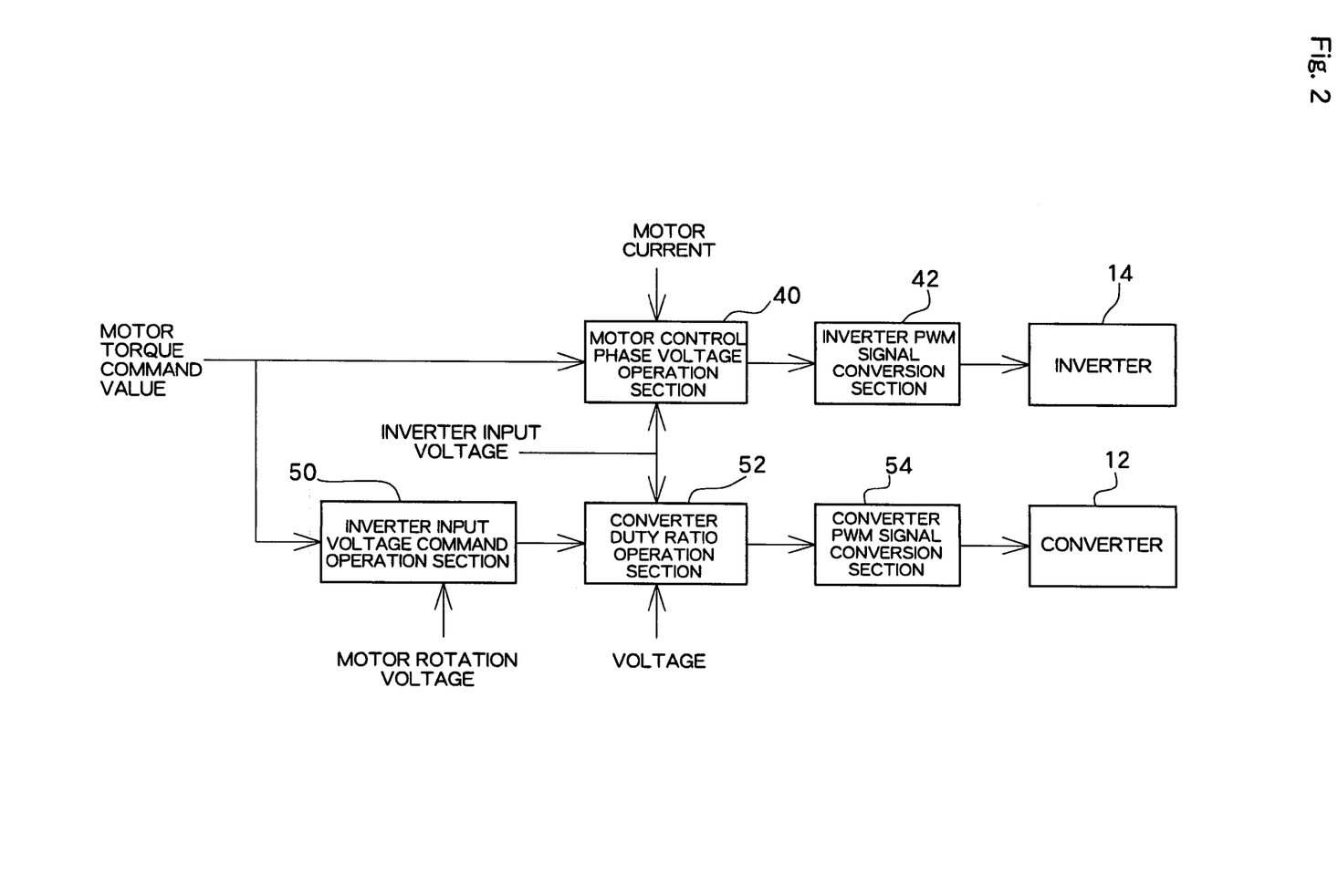
FIG. 2 is a control block diagram for a control device.

A structural block diagram of the controller 30 is shown in FIG. 2. A motor torque command value, motor current values for each phase detected by the current sensors 22 and an inverter input voltage detected by the voltage sensor 22 are provided to a motor control phase voltage operation unit 40. The motor control phase voltage operation unit 40 calculates voltages for each phase coil of the motor from these input signals and supplies these to an inverter PWM signal converter 42. The inverter PWM signal converter 42 practically generates PWM signals for turning each of the transistors Q3–Q8 of the inverter 14 on or off and supplies the PWM signals to the bases of the transistors Q3 to Q8 to control switching of the transistors Q3–Q8 and thereby control current in each phase of the motor M1.

In this manner, motor drive current is controlled and it is possible to control motor output torque in response to a motor torque command value.

On the other hand, the motor torque value is also supplied to an inverter input voltage command operation unit 50. The rotational speed of the motor is also supplied to the inverter input voltage command operation unit 50, and the inverter input voltage command operation unit 50 calculates an optimum inverter input voltage value (target value) from motor rotation speed and a motor torque command value.

This target value is supplied to a converter duty ratio operation unit 52. Inverter input voltage and battery voltage are also supplied to the converter duty ratio operation unit 52, and a duty ratio for setting the inverter input voltage to the target value is calculated from the input voltages. Specifically, the output voltage of the converter 12 is controlled by controlling the on/off duty ratio of the switching elements transistor Q1 and Q2, and duty cycle is calculated so that the inverter input voltage becomes the target value. The calculation results are then supplied to a converter PWM signal converter 54, and this converter PWM signal converter 54 PWM controls the transistors Q1 and Q2 of the converter 12.

Since electrical power storage for the reactor L1 is made large by making the on duty of the lower transistor Q2 large, it is possible to obtain a higher voltage output. On the other hand, the power source line voltage is lowered by increasing the on duty of the upper transistor Q1. By controlling the duty ratio of the transistors Q1 and Q2, therefore, it is possible to control the power source line voltage at an arbitrary voltage greater than the voltage of the battery B1. In particular, the motor M1 can generate using regeneration, but when the motor M1 is in regeneration the power source line voltage increases which means that the upper transistor Q1 will be turned on and the power source line voltage is maintained as a specified value.

Figure 3:
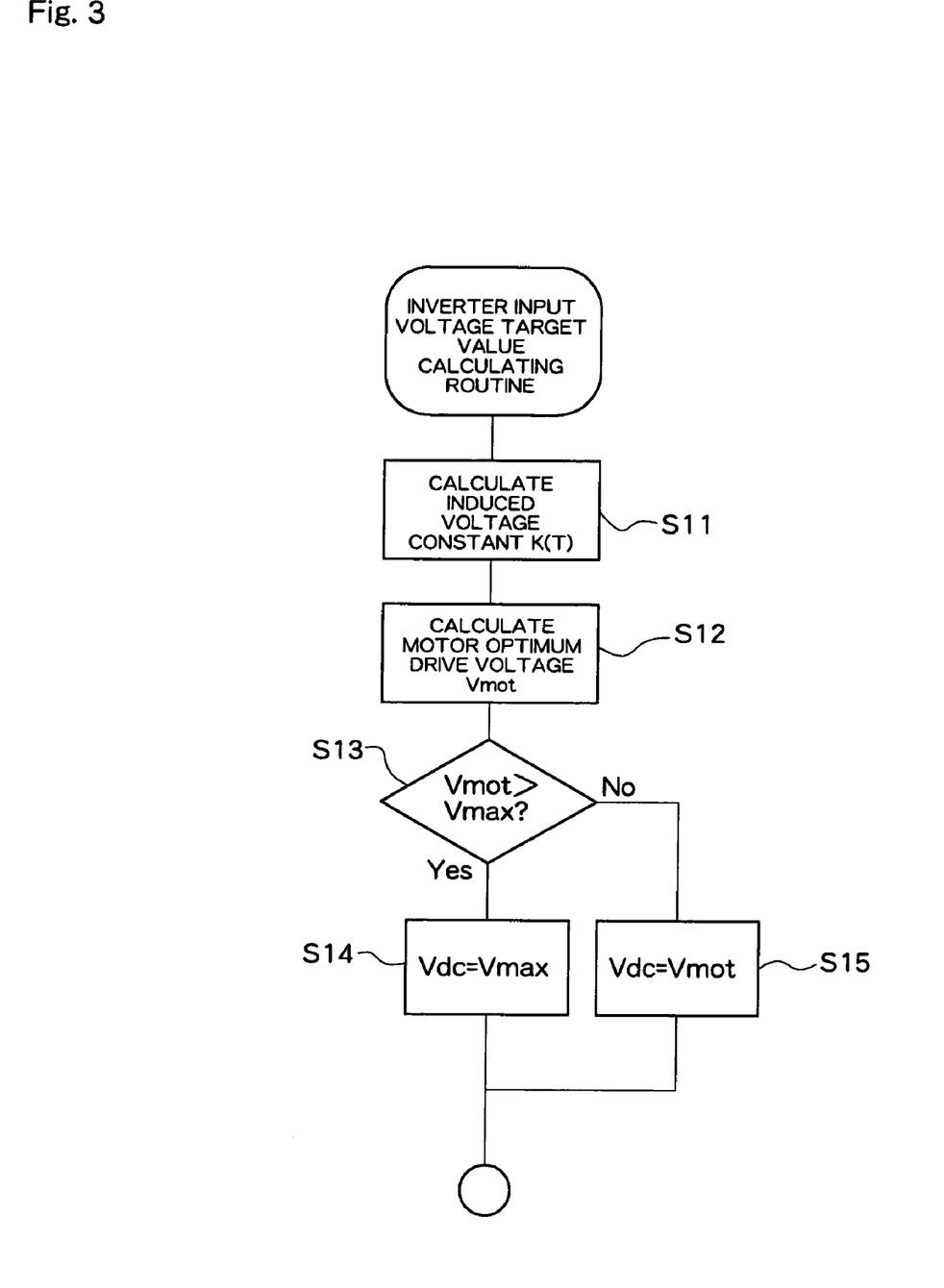
FIG. 3 is a flowchart showing operation of an inverter input voltage command operation section.
Figure 4:
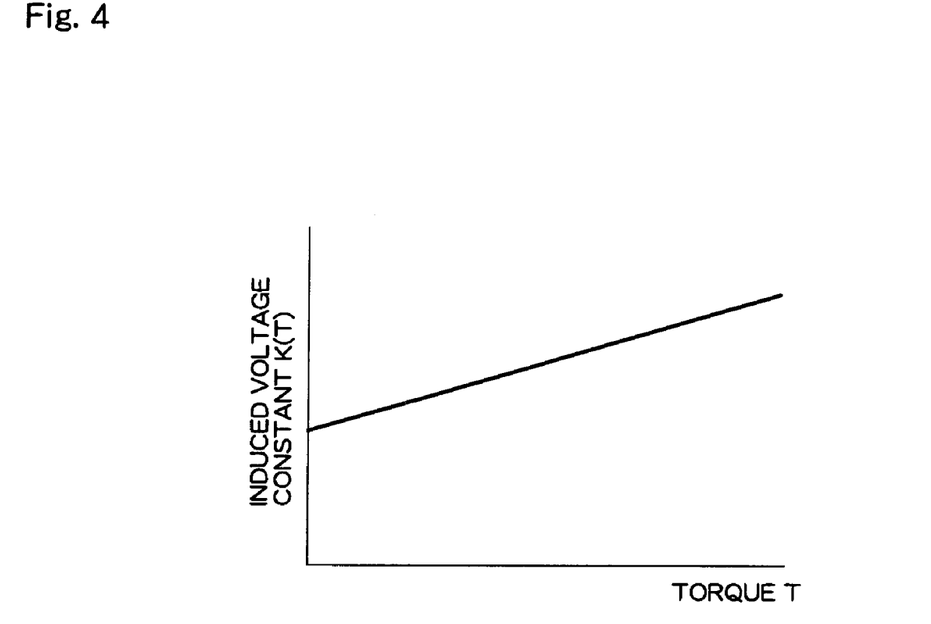
FIG. 4 is a drawing showing a relationship between torque command T and induced voltage constant K (T).

Here, calculation of the target value in the inverter input voltage command operation unit 50 will be described based on FIG. 3. First of all, an induced voltage constant K(T) is calculated (S11). The relationship of an induced voltage constant K(T) (line voltage per revolution) to torque of a permanent magnet motor is as shown in FIG. 4. When torque is zero, the induced voltage constant K(T) is equivalent to a reverse voltage, and as torque increases the induced voltage constant K also increases. This characteristic is stored internally as a map, and an induced voltage constant K(T) is output according to a motor torque command value (T). This characteristic differs depending on individual motor characteristics, and is obtained in advance for each motor.

Next, a motor optimum drive voltage Vmot is calculated (S12). This motor optimum drive voltage is calculated from the product of the induced voltage constant K(T) and the motor rotational speed N, and a conversion factor a for dc voltage and ac voltage, using the following equation:

$$Vmot = K(T) \times N/\alpha$$

The conversion factor is about 0.61–0.78.

That is, a corresponding induced voltage constant K(T) is determined from motor torque, voltage applied to the motor is determined from rotational speed at that time, and inverter input voltage (dc voltage) is obtained by dividing the applied voltage by the conversion factor $\alpha$.

Next, it is determined whether the obtained motor optimum drive voltage Vmot is larger than the system upper limit voltage Vmax (S13). The upper limit voltage the system is capable of boosting to is limited by the withstand voltage of the switching elements of the converter 12 and inverter 14 and the capacitor C1.

Figure 5:
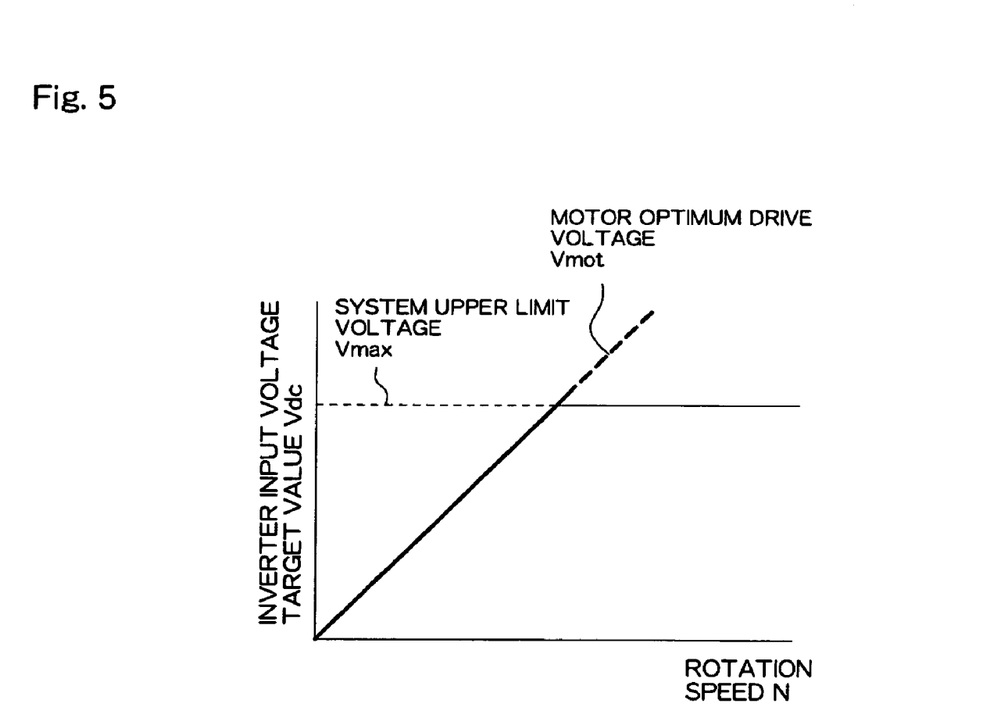
FIG. 5 is a drawing showing the relationship between rotational speed N and inverter input voltage target value Vdc.

If the decision in S13 is YES, it is not possible to set the inverter input voltage Vdc as it is, and instead inverter input voltage Vdc is made Vmax (S14). On the other hand, if the decision in S13 is NO, there is no problem and so inverter input voltage Vdc is made Vmot (S15). That is, as shown in FIG. 5, an inverter input voltage target value Vdc is raised to the system upper limit voltage Vmax in response to motor optimum drive voltage Vmot which increases with rotational speed, and after reaching the system upper limit voltage Vmax that target value Vdc is maintained at Vmax.

In this manner, inverter input voltage target value Vdc is calculated in the inverter input voltage command operation unit 50.

According to this embodiment, optimum applied voltage for the motor at that time is calculated based on motor rotational speed and an output torque command, and an inverter input voltage command value is determined based on this applied voltage. Accordingly, efficient drive of the motor can be achieved through application of an optimum voltage based on drive conditions of the motor at that time. That is, if the inverter input voltage and motor applied voltage at the time of high motor output torque correspond, a correspondingly large current must flow. Energy loss in the inverter and the motor therefore becomes large. Loss due to a resistive component of a line etc. is also large. With this embodiment it is possible to prevent this type of deterioration in efficiency by raising the inverter input voltage. Also, since it is possible to reduce the maximum current amount, it is also possible to miniaturize and reduce the cost of the inverter and motor.

Also, since optimum voltage is calculated and the inverter input voltage is controlled to the optimum voltage, it is possible to prevent deterioration in efficiency due to rise of the inverter input voltage beyond what is necessary. Specifically, if inverter input voltage is high, the product of current and voltage at that time is increased and switching loss becomes large. Also, since it is possible to maintain output torque in a high rotational speed region of the motor, it is possible as a result to miniaturize and reduce the cost of the motor.

Figure 6:
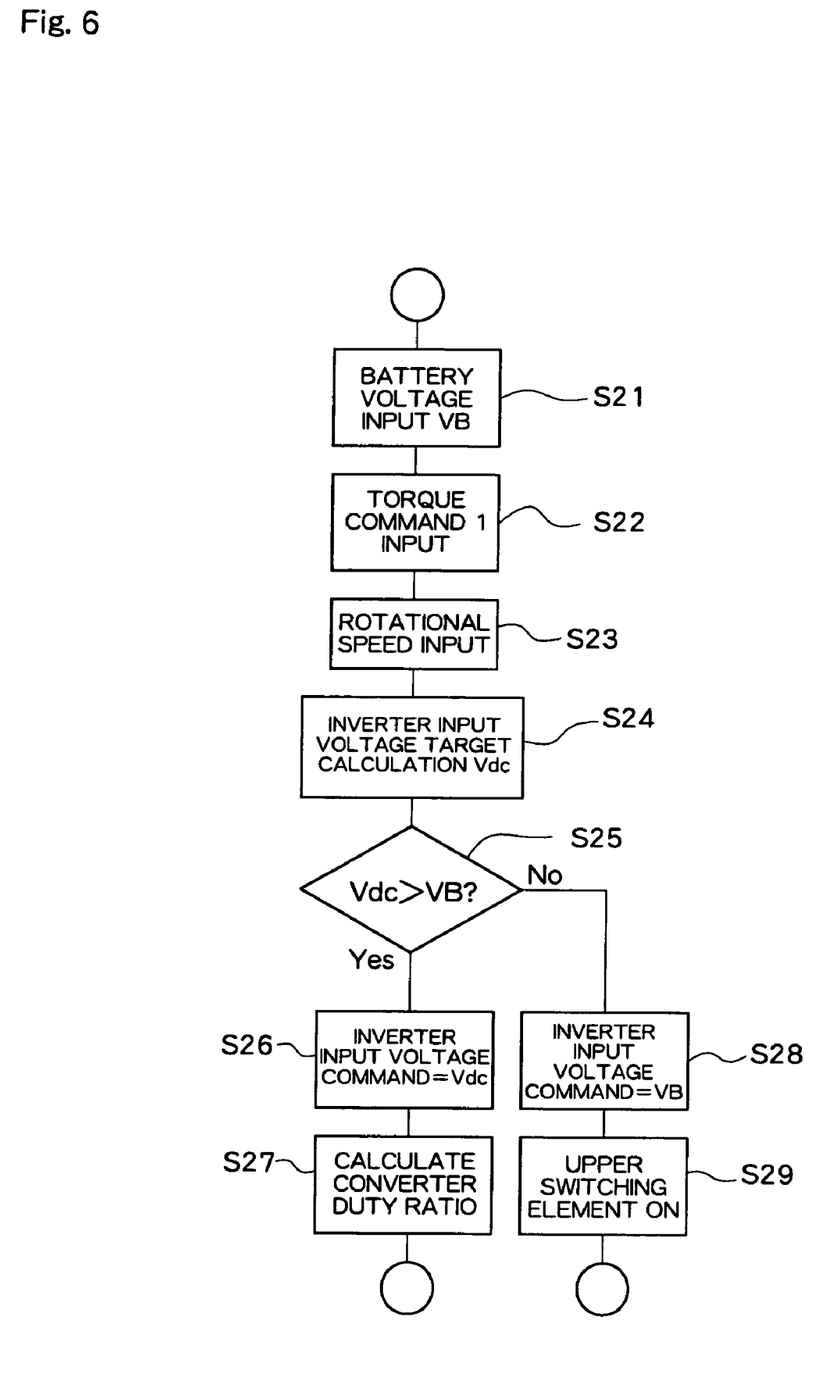
FIG. 6 is a flowchart showing a processing operation of the control section.

Next, a flowchart of another embodiment is shown in FIG. 6. With this example, it is assumed that a calculated inverter input voltage Vd is lower than battery voltage.

First of all battery voltage VB is taken in from a voltage sensor 20 (S21). Next, the motor torque command and motor rotational speed N are taken in (S22, S23). The inverter input voltage command operation unit 50 then calculates the inverter input voltage target value Vdc as described above (S24), and it is determined whether the obtained target value Vdc is larger than the battery voltage VB. If the decision is YES, boosting should be carried out and so the inverter input voltage target value is made Vdc as it is (S26), and the converter duty ratio operation unit 52 calculates duty ratio for the converter 12 (S27). On the other hand, if the decision in S25 is NO, boost by the converter 12 is not necessary. Inverter input voltage target value is then set to VB (S28) and the upper transistor Q1 of the converter is turned on (S29). In this way, the power source line of the inverter is connected as it is to the battery B1 through the reactor L1.

Therefore, in this embodiment it is possible to drive the motor using the battery voltage VB, and also to supply generated power directly to the battery B1 when the motor M1 is in regeneration. This means that it is not necessary to perform switching in the converter 12 and it is possible to reduce switching loss.

Figure 7:
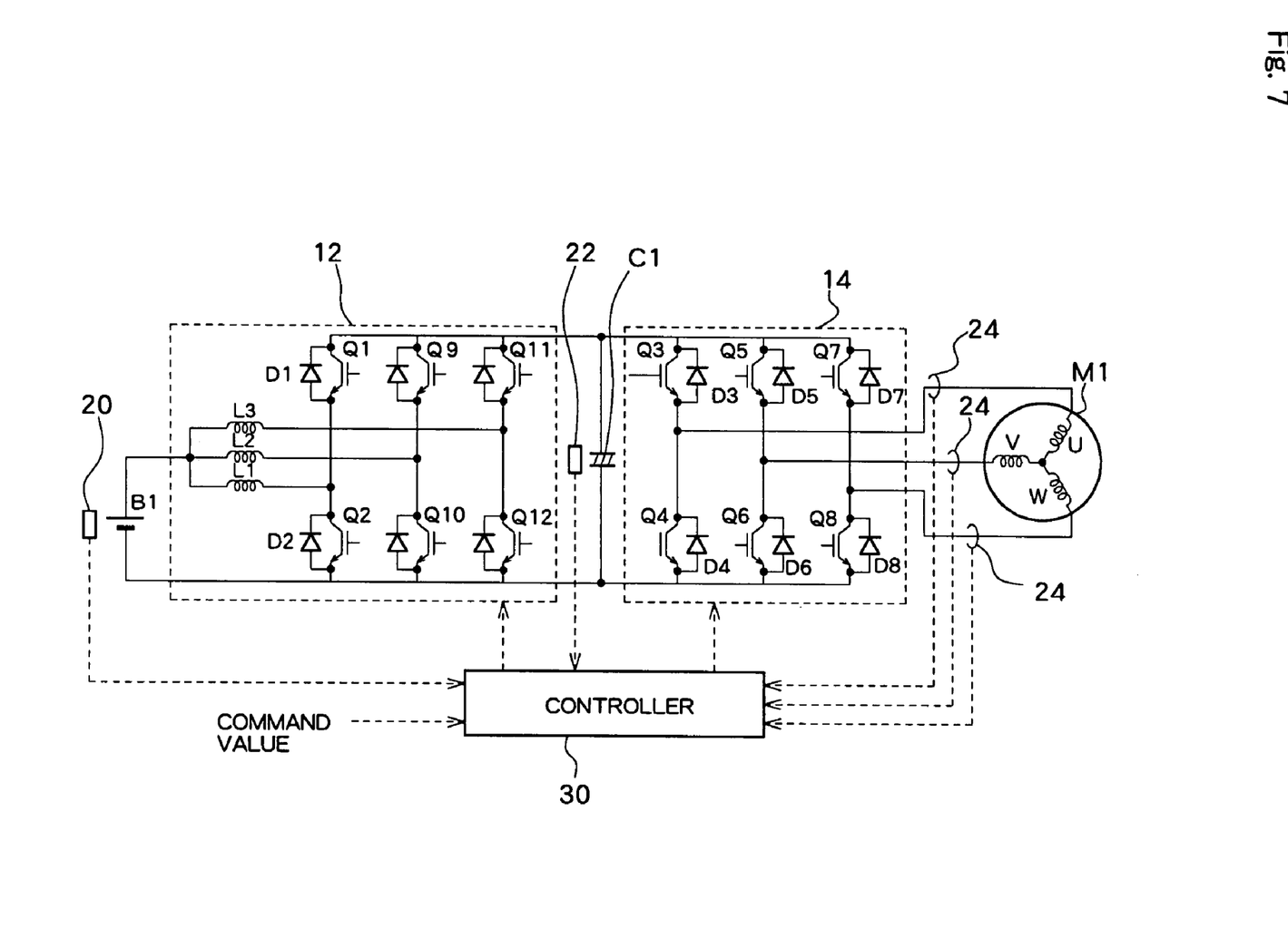
FIG. 7 is a drawing showing the structure of another embodiment (three phase structure).

The structure of another embodiment is shown in FIG. 7. With this example, the converter 12 has a three-phase structure. Reactors L1, L2 and L3 and transistors Q1, Q2, Q9, Q10, Q11 and Q12 are provided. That is, the reactors L2 and L3 have one end connected together with the reactor L1 to the positive terminal of the battery B1. Also, the other end of the reactor L2 is connected to a power source line through transistor Q9, and to earth through transistor Q10. Similarly, the other end of the reactor L3 is connected to the power source line through transistor Q11 and connected to earth through transistor Q12. Diodes allowing current to flow in the direction of emitter to collector are also connected to each of the transistors Q9–Q12.

In this type of converter 12 also, a high voltage is generated at the other end (inverter side) of the reactors L1, L2 and L3 by switching respective transistors Q1, Q2, Q9, Q10, Q11 and Q12, and it is possible to perform boosting. In particular, by having three phases in this way it is possible to carry out boosting with suppressed ripple by sequentially switching the transistor on and off.

Figure 8:
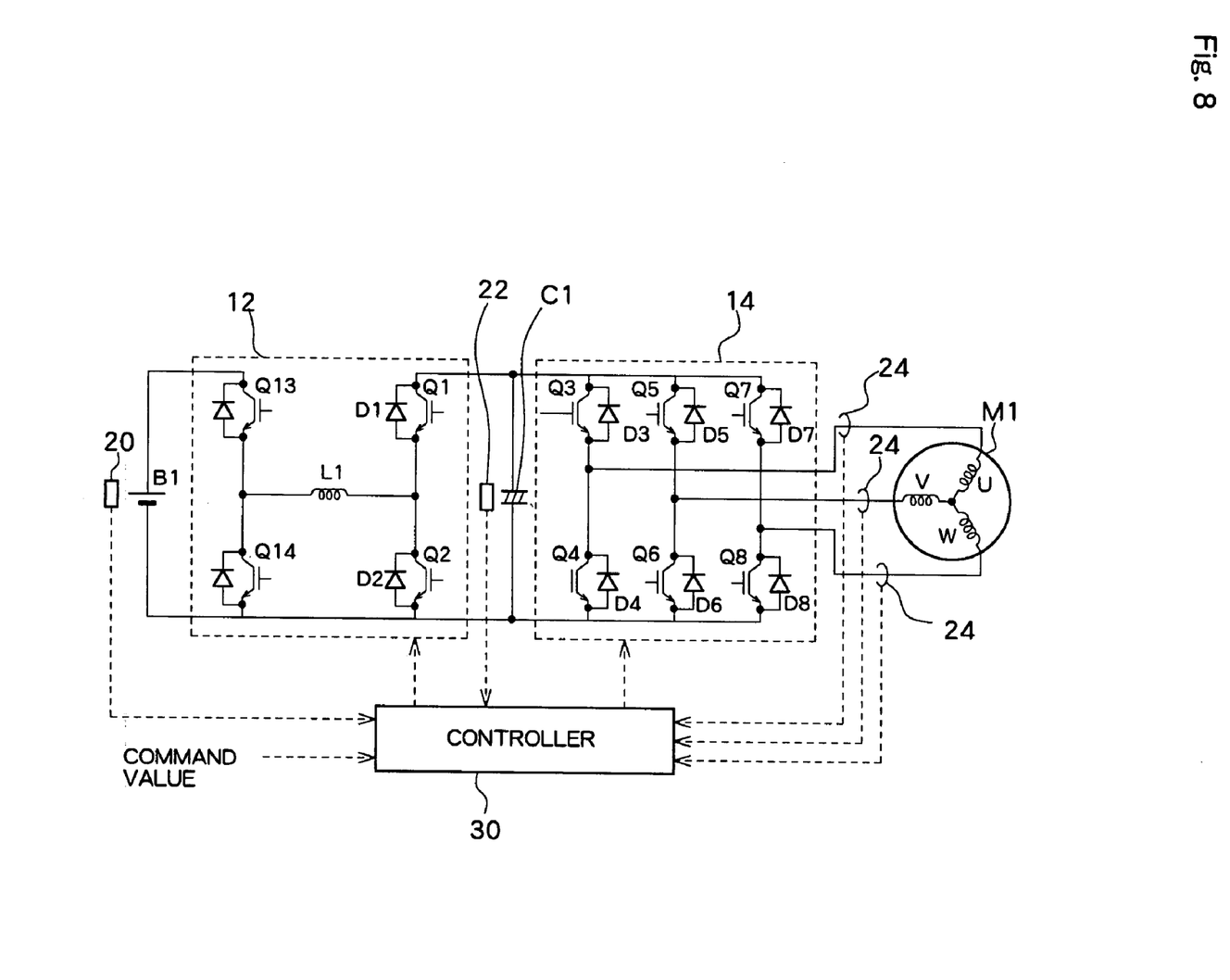
FIG. 8 is a drawing the structure of yet another embodiment (full bridge structure).

The structure of yet another embodiment is shown in FIG. 8. With this example, the converter 12 is formed as a full bridge. Specifically, one end of the reactor L1 is not connected directly to the positive electrode of the battery B1, but is connected to the positive electrode through an NPN transistor Q13, and is connected to earth through an NPN transistor Q14. That is, one end of the reactor L1 is connected to the emitter of transistor Q13 and also to the collector of transistor Q14. The collector of transistor Q13 is then connected to the positive electrode of the battery B1, and the emitter of transistor Q14 is connected to earth. Diodes allowing current to flow in a direction from emitter to collector are also connected to these transistors Q13 and Q14.

With this structure, it is possible to obtain a voltage lower than the battery voltage at the other end of the reactor L1 by switching the transistors Q13 and Q14. In particular, it is possible to obtain an arbitrary output voltage by performing PWM control of the transistors Q13 and Q14.

In the event that an inverter input voltage target value Vdc is lower that battery voltage VB, it is possible to obtain that target output voltage in the converter 12. In this case also, it is possible to always drive the motor with optimum efficiency. For example, by making the inverter input voltage low, it is possible to increase the period that switching elements of the inverter are full on, and it is possible to reduce switching loss.

Figure 9:
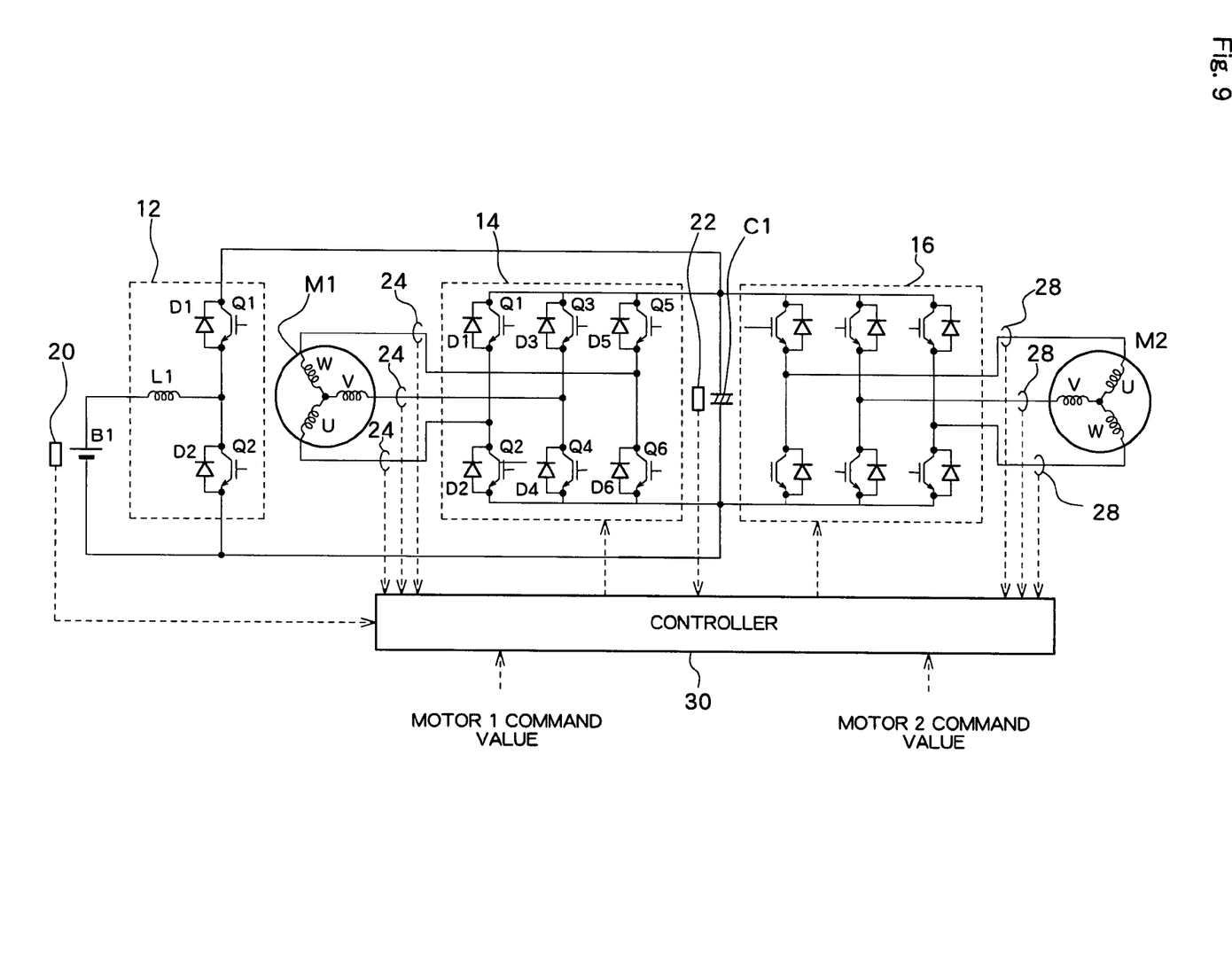
FIG. 9 is a drawing the structure of a still further embodiment (two motor system).

FIG. 9 shows still another embodiment of the present invention. In this example, two inverters and two motors are provided. An inverter 16 is provided between the power source line and earth, as well as the inverter 14, and a motor M2 is connected to this inverter 16. The structure of this inverter 16 is the same as that of the inverter 14, and the motor M2 also has ends of respective phase coils connected to mid points of respective phase arms of the inverter 16. Motor current of each phase arm of the inverter 16 is also detected by current sensors 28 and supplied to the controller 30.

Figure 10:
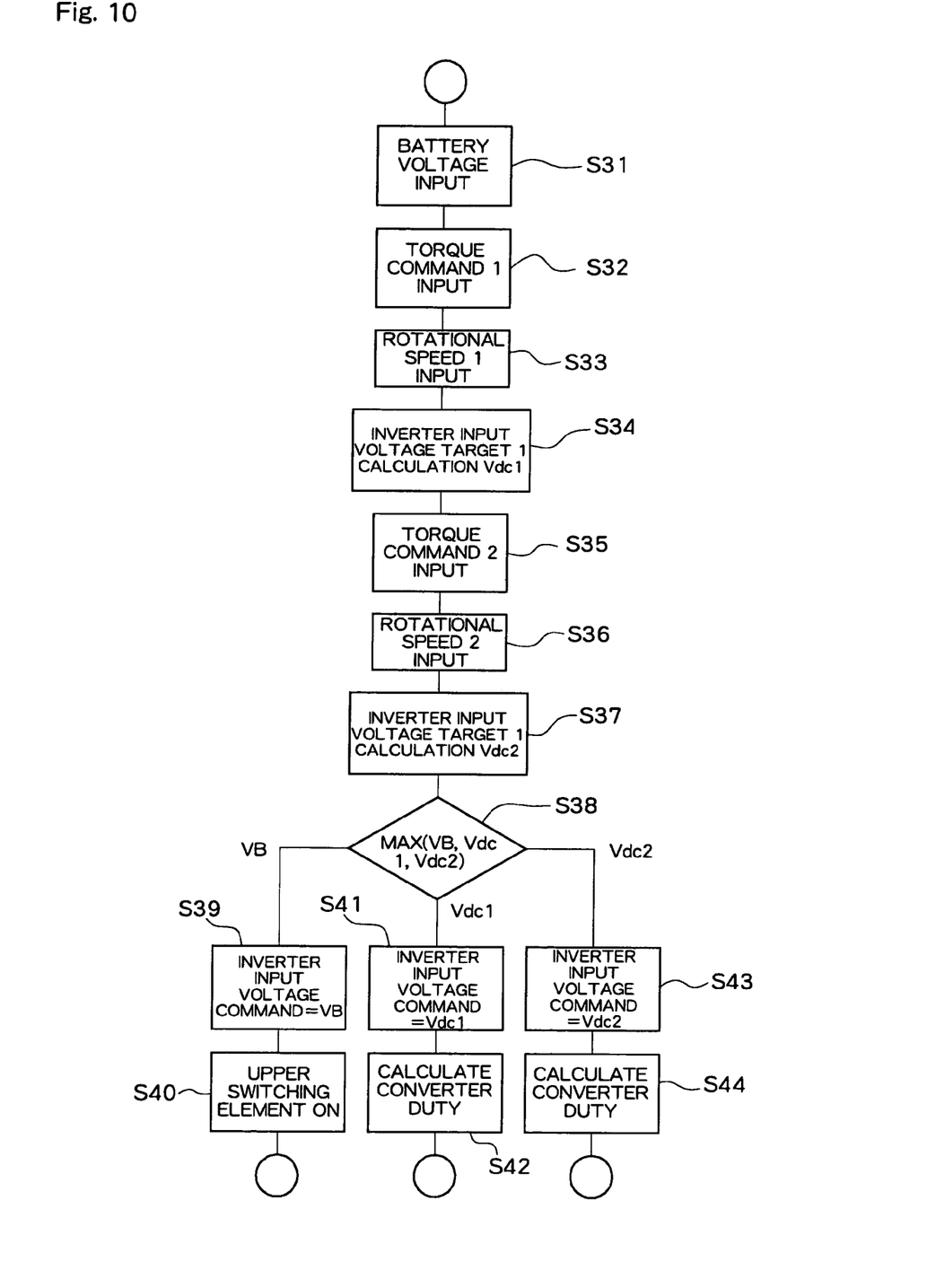
FIG. 10 is a flowchart showing a processing operation in the case of a 2-motor system.

Operation of this device will now be described based on FIG. 10. First of all, battery voltage VB is taken in (S31). Next, a motor M1 torque command 1 and motor rotational speed N1 are taken in (S32, S33). An inverter input voltage target value for driving motor M1 is then calculated (S34). Next, a motor M2 torque command 2 and motor rotational speed N2 are taken in (S35, S36), and an inverter input voltage target value for driving motor M2 is then calculated (S37).

It is then determined which of the battery voltage VB, target value Vdc1 and target value Vdc2 is the largest (S38).

If it is determined that VB is the largest, the inverter input voltage target value is set to VB (S39), and the upper transistor Q1 of the converter is turned on (S40).

If it is determined in S38 that Vdc1 is the largest, the inverter input voltage target value is set to Vdc1 (S41), and the duty ratio of the converter 12 is calculated (S42). If it is determined in S38 that Vdc2 is the largest, the inverter input voltage target value is set to Vdc2 (S43), and the duty ratio of the converter 12 is calculated (S44).

In this way, the inverter input voltage target value is set to whichever of Vdc1 and Vdc2 is the largest voltage. When the inverter input voltage is smaller than an optimum value loss is larger than when the input voltage is larger than the optimum voltage, and with this embodiment it is possible to achieve efficient motor drive The present invention can be uses in drive control for a traveling motor of a hybrid vehicle or an electric vehicle.

The invention claimed is:

1. A motor drive controller, for supplying output of a dc power source to a first motor through an inverter and controlling drive of the first motor, comprising:
    a converter for voltage converting output voltage from the dc power source for supply to the inverter; and
    a control section for controlling supply current to the first motor through PWM control of the inverter,
    the inverter comprising a U phase arm, a V phase arm and a W phase arm, each of the U phase arm, the V phase arm and the W phase arm including two transistors connected in series,
    the converter comprising:
    a reactor connected at one end to the dc power source, and at least two switching elements, being an upper switching element connecting the other end of the reactor to a power source side of the inverter and a lower switching element connecting to an earth side of the inverter, wherein
    the control section calculates an inverter input voltage target value appropriate to efficient motor drive in response to rotational speed of the first motor and a target output torque, and performs PWM control of the converter switching elements in order to achieve the input voltage target value, and
    a separate inverter for supplying current to a second motor is connected to the output of the converter, and the control section outputs a higher voltage of two inverter input target voltages calculated from rotational speeds and target outputs of the first and second motors.

2. The motor drive controller of claim 1, wherein the converter has a three phase structure provided with three sets of the reactor and two switching elements.

3. The motor drive controller of claim 2, wherein, when the inverter input voltage target value is lower than the dc source voltage, the upper switching element of the inverter is turned on and the lower switching element is turned on.

4. The motor drive controller of claim 1, wherein the converter has a full bridge configuration with both ends of a battery and one end of a reactor being connected through two switching elements.

5. The motor drive controller of claim 1, wherein, when the calculated inverter input target voltage exceeds a specified upper limit value, the control section sets the input target voltage to the upper limit value.

6. A motor drive control method, for a two motor system comprising a converter, including a reactor, having one end connected to a dc power source, and at least two switching elements, being an upper switching element connecting another end of the reactor to a power source side of a first inverter, and a lower switching element connecting to an earth side of the first inverter; second and third inverters for receiving output from the converter and converting to a specified alternating current, and two motors respectively driven by alternating current from the second and third inverters wherein inverter input voltage target values suitable for efficient drive of the two motors are calculated in response to rotation speed and target output torque of the two motors to provide two calculated inverter input voltage target values, and of the two calculated inverter input voltage target values, a higher voltage is selected as a target value and the switching elements of the first inverter are subjected to PWM control.

7. A computer-readable medium encoded with a computer-executable motor drive control program for a two motor system, the two motor system comprising a converter, including a reactor, having one end connected to a dc power source, and at least two switching elements, being an upper switching element connecting another end of the reactor to a power source side of a first inverter, and a lower switching element connecting to an earth side of the first inverter; second and third inverters for receiving output from the converter and converting to a specified alternating current, two motors respectively driven by alternating current from the second and third inverters, and a control section for controlling switching of the switching elements of the converter, the motor drive control program containing instructions to intruct the control section to calculate inverter input voltage target values to provide two calculated inverter input voltage target values suitable for efficient drive of the two motors in response to rotation speed and target output torque of the two motors, adopt a higher voltage of the two calculated inverter input voltage target values as a target value, and subject the switching elements of the first inverter to PWM control so that converter output becomes the adopted target value.

8. The motor drive controller of claim 2, wherein, when the inverter input voltage target value is lower than the dc source voltage, the upper switching element of the inverter is turned on and the lower switching element is turned on.

9. The motor drive controller of claim 2, wherein the converter has a full bridge configuration with both ends of a battery and one end of a reactor being connected through two switching elements.

10. A motor drive controller, for supplying output of a dc power source to a first motor through an inverter and controlling drive of the first motor, comprising:
a converter for voltage converting output voltage from the dc power source for supply to the inverter; and
a control section for controlling supply current to the first motor through PWM control of the inverter,
the inverter comprising a U phase arm, a V phase arm and a W phase arm, each of the U phase arm, the V phase arm and the W phase arm including two transistors connected in series,
the converter comprising:
a reactor connected at one end to the dc power source, and at least two switching elements, being an upper switching element connecting the other end of the reactor to a power source side of the inverter and a lower switching element connecting to an earth side of the inverter, wherein
the control section calculates an inverter input voltage target value appropriate to efficient motor drive in response to rotational speed of the first motor and a target output torque, and performs PWM control of the converter switching elements in order to achieve the input voltage target value,
wherein the converter has a three phase structure provided with three sets of the reactor and two switching elements,
wherein a separate inverter for supplying current to a second motor is connected to the output of the converter, and the control section outputs a higher voltage of two inverter input target voltages calculated from rotational speeds and target outputs of the first and second motors.

11. A motor drive controller, for supplying output of a dc power source to a first motor through an inverter and controlling drive of the first motor, comprising:
a converter for voltage converting output voltage from the dc power source for supply to the inverter; and
a control section for controlling supply current to the first motor through PWM control of the inverter,
the inverter comprising a U phase arm, a V phase arm and a W phase arm, each of the U phase arm, the V phase arm and the W phase arm including two transistors connected in series,
the converter comprising:
a reactor connected at one end to the dc power source, and at least two switching elements, being an upper switching element connecting the other end of the reactor to a power source side of the inverter and a lower switching element connecting to an earth side of the inverter, wherein
the control section calculates an inverter input voltage target value appropriate to efficient motor drive in response to rotational speed of the first motor and a target output torque, and performs PWM control of the converter switching elements in order to achieve the input voltage target value,
wherein, when the inverter input voltage target value is lower than the dc source voltage, the upper switching element of the inverter is turned on and the lower switching element is turned on,
wherein a separate inverter for supplying current to a second motor is connected to the output of the converter, and the control section outputs a higher voltage of two inverter input target voltages calculated from rotational speeds and target outputs of the first and second motors.

12. A motor drive controller, for supplying output of a dc power source to a first motor through an inverter and controlling drive of the first motor, comprising:
a converter for voltage converting output voltage from the dc power source for supply to the inverter; and
a control section for controlling supply current to the first motor through PWM control of the inverter,
the inverter comprising a U phase arm, a V phase arm and a W phase arm, each of the U phase arm, the V phase arm and the W phase arm including two transistors connected in series,
the converter comprising:
a reactor connected at one end to the de power source, and at least two switching elements, being an upper switching element connecting the other end of the reactor to a power source side of the inverter and a lower switching element connecting to an earth side of the inverter, wherein
the control section calculates an inverter input voltage target value appropriate to efficient motor drive in response to rotational speed of the first motor and a target output torque, and performs PWM control of the converter switching elements in order to achieve the input voltage target value,
wherein the converter has a full bridge configuration with both ends of a battery and one end of a reactor being connected through two switching elements, wherein a separate inverter for supplying current to a second motor is connected to the output of the converter, and the control section outputs a higher voltage of two inverter input target voltages calculated from rotational speeds and target outputs of the first and second motors.

13. The motor drive controller of claim 1, wherein, when the calculated inverter input target voltage exceeds a specified upper limit value, the control section sets the input target voltage to the upper limit value.

14. The motor drive controller of claim 3, wherein, when the calculated inverter input target voltage exceeds a specified upper limit value, the control section sets the input target voltage to the upper limit value.

15. The motor drive controller of claim 4, wherein, when the calculated inverter input target voltage exceeds a specified upper limit value, the control section sets the input target voltage to the upper limit value.

16. A motor drive controller, for supplying output of a dc power source to a first motor through an inverter and controlling drive of the first motor, comprising:
   a converter for voltage converting output voltage from the dc power source for supply to the inverter; and
   a control section for controlling supply current to the first motor through PWM control of the inverter,
   the converter comprising:
   a reactor connected at one end to the dc power source, and at least two switching elements, being an upper switching element connecting the other end of the reactor to a power source side of the inverter and a lower switching element connecting to an earth side of the inverter, wherein
   the control section calculates an inverter input voltage target value appropriate to efficient motor drive in response to rotational speed of the first motor and a target output torque, and performs PWM control of the converter switching elements in order to achieve the input voltage target value,
   wherein a separate inverter for supplying current to a second motor is connected to the output of the converter, and the control section outputs a higher voltage of two inverter input target voltages calculated from rotational speeds and target outputs of the first and second motors.

17. The motor drive controller of claim 16, wherein, when the calculated inverter input target voltage exceeds a specified upper limit value, the control section sets the input target voltage to the upper limit value.

* * * * *